United States Patent

Martin

[15] 3,636,343
[45] Jan. 18, 1972

[54] SELF-LEVELLING VEHICLE LAMPS

[72] Inventor: Frederick R. P. Martin, Bromley Kent, England

[73] Assignee: Martin Ward Developments Limited, London, England

[22] Filed: May 8, 1969

[21] Appl. No.: 822,978

[30] Foreign Application Priority Data

May 13, 1968 Great Britain.......................22601/68
Feb. 21, 1969 Great Britain..........................9618/69

[52] U.S. Cl.......................................240/7.1 LJ
[51] Int. Cl............................................B60g 1/10
[58] Field of Search..................................240/7.1, 7.1 LJ

[56] References Cited

UNITED STATES PATENTS

| | | | |
|---|---|---|---|
| 3,370,162 | 2/1968 | Henry-Biabaud | 240/7.1 |
| 3,316,397 | 4/1967 | Yssel | 240/7.1 |
| 3,402,287 | 9/1968 | Hindman | 240/7.1 |
| 3,336,470 | 8/1967 | Sombardier | 240/7.1 |
| 2,984,737 | 5/1961 | Marcellus | 240/7.1 |

Primary Examiner—Samuel S. Matthews
Assistant Examiner—Russell E. Adams, Jr.
Attorney—Stevens, Davis, Miller & Mosher

[57] ABSTRACT

A self-levelling vehicle light system in which a control from the vehicle suspension provides a signal in accordance with changes in attitude of the vehicle relative to the road. A lamp support is tiltable about a horizontal pivotal axis in response to the signal, a resilient connection being provided both between the signal and the lamp support and the lamp support and a fixed mounting and a damper being provided for damping sudden movements of the lamp support.

8 Claims, 6 Drawing Figures

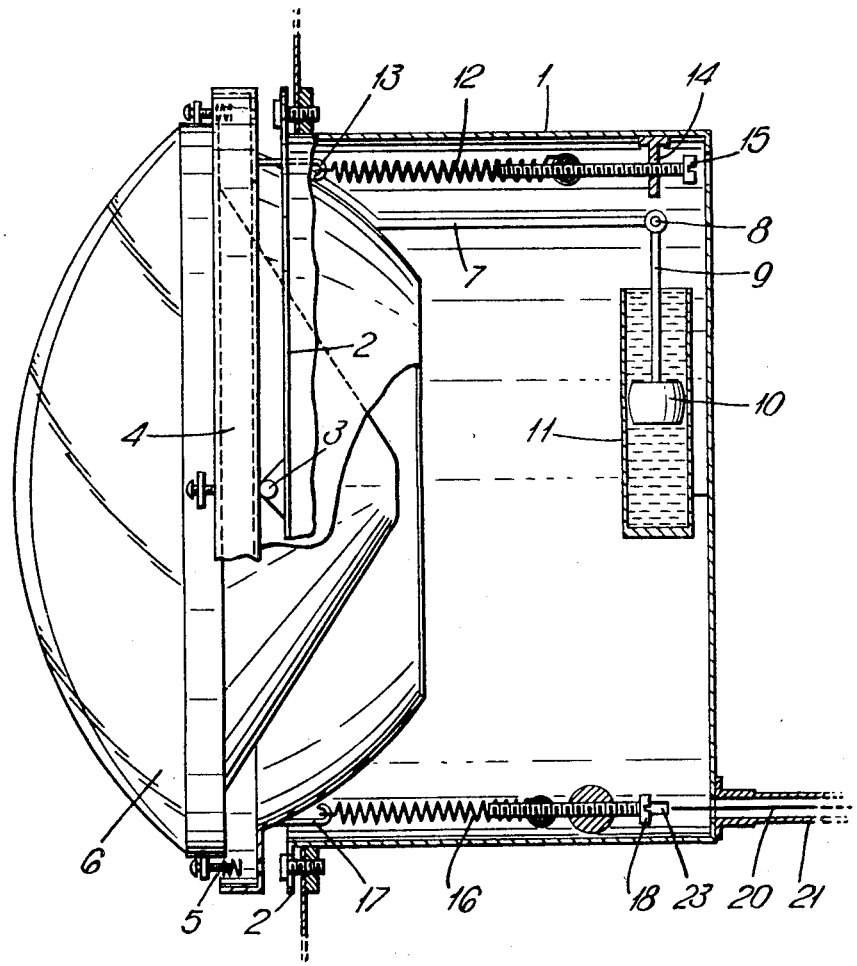

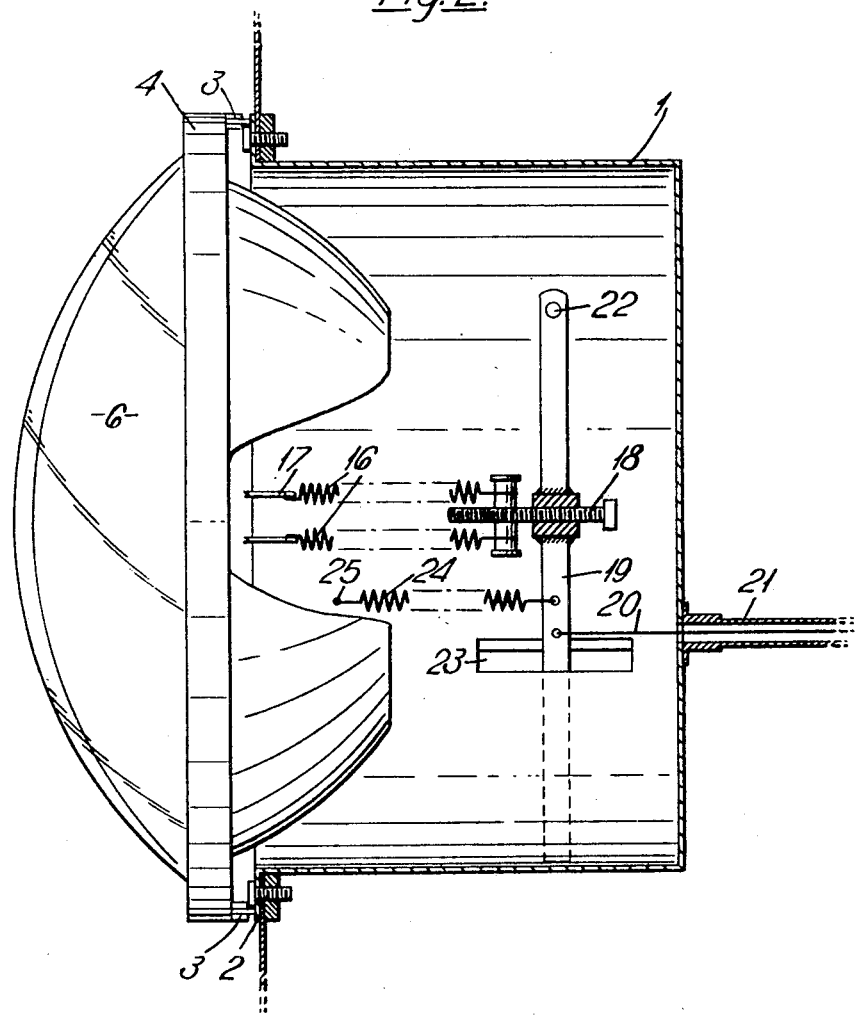

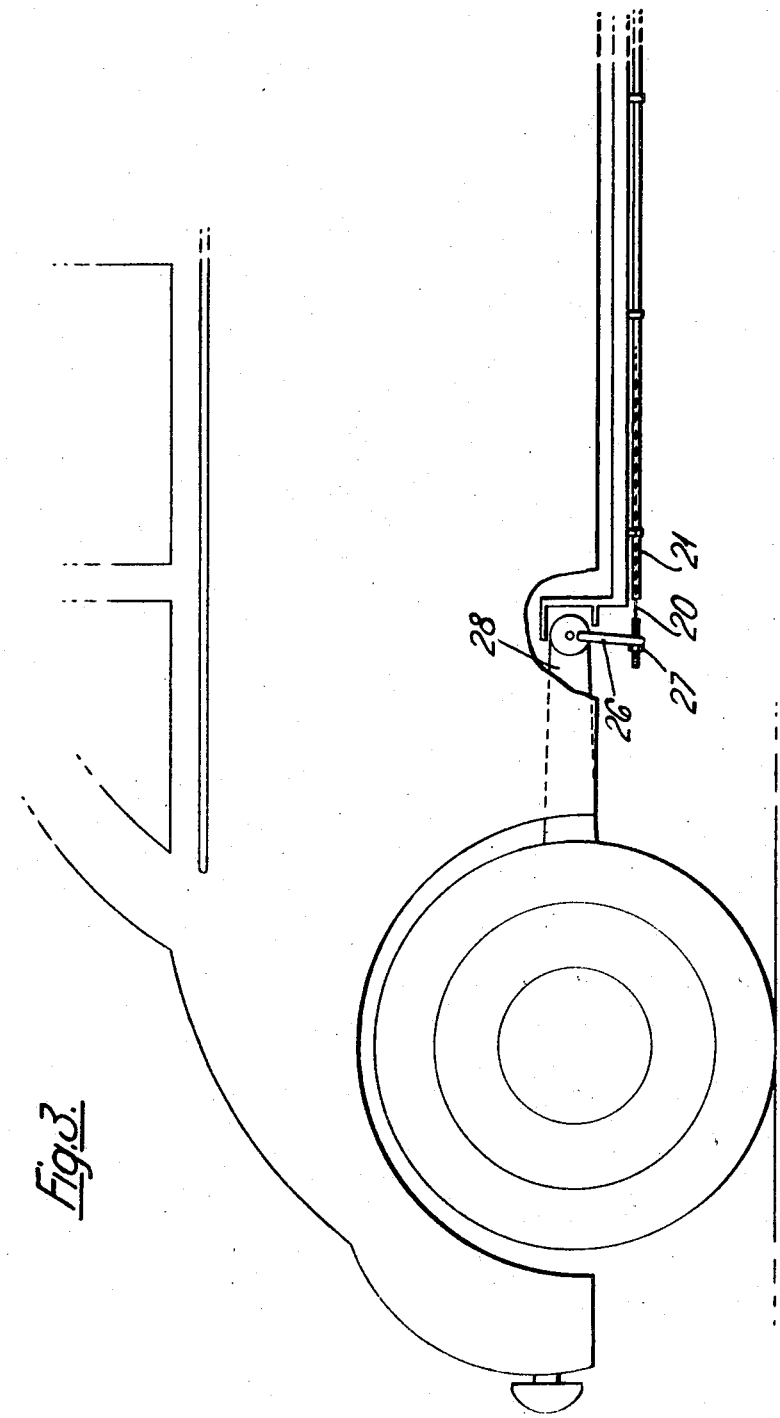

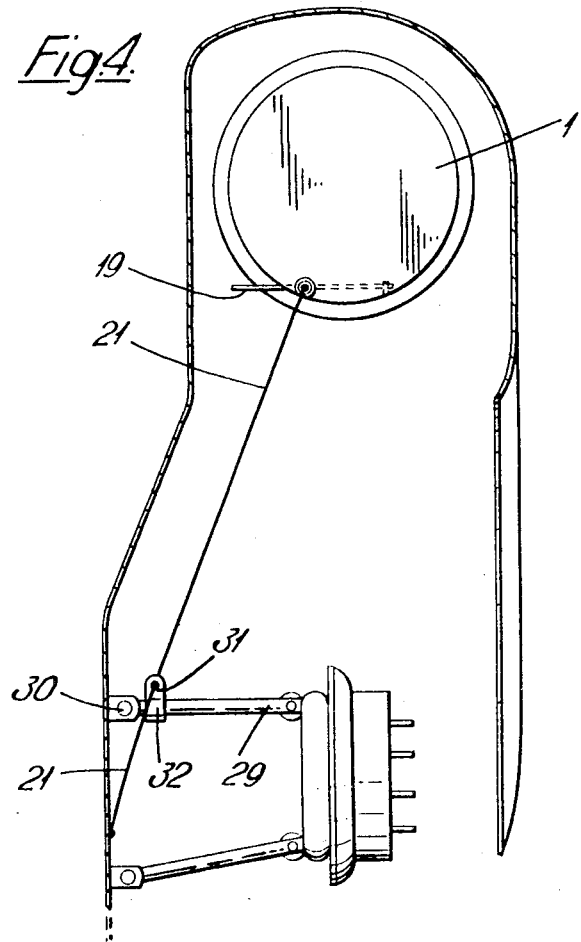
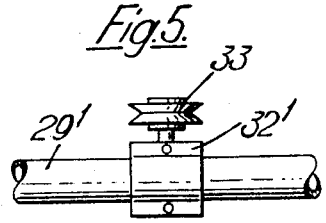

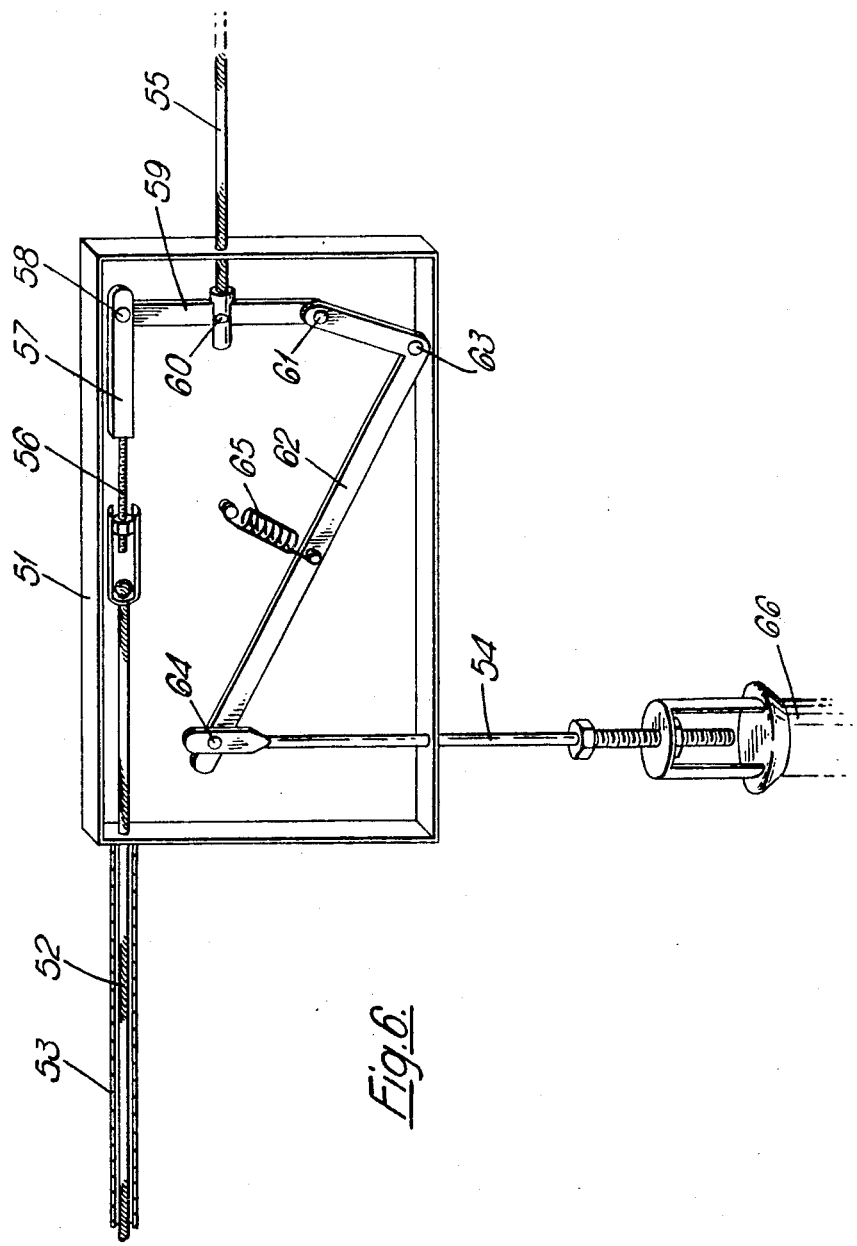

SELF-LEVELLING VEHICLE LAMPS

This invention relates to self-levelling vehicle lamps and more especially to self-levelling vehicle lamp systems which include means for adjusting the angle of projection in azimuth of the vehicle lamp to take into account changes in attitude of the vehicle in which it is mounted, as by reason of changes in static loading of the vehicle or the dynamic forces due to acceleration and deceleration.

According to the invention there is provided a self-levelling vehicle lamp system comprising means for pivoting a lamp support about a substantially horizontal axis, means for damping pivoted movement of the lamp support, and means for applying a correcting bias via a resilient linkage to tilt the lamp support as a result of a control signal derived from a change in vehicle attitude. Conveniently the signal may be derived from the vehicle suspension as, for instance, from displacement of the rear suspension. Thus conveniently the signal may be derived from pivotal movements of a torque arm connecting the rear wheel suspension to the vehicle body so that loading of the rear of the vehicle which causes the vehicle attitude to be inclined downwardly to the rear and which would cause a fixed headlamp to project an upwardly directed beam, can cause the lamp to be tilted downwardly about a horizontal axis so as to maintain an optimum angle of projection.

Preferably the resilient linkage comprises a pair of interconnected springs arranged in series, one being connected to a fixed mounting and the other being connected to receive the control signal, the lamp support being controllable by movements of the point of interconnection.

While under most circumstances it is the rear suspension of a passenger car which has the greatest effect on the attitude of the vehicle the front suspension also does get displaced due to static loading conditions, and even more so due to dynamic variation as a result of acceleration or deceleration. Accordingly it is preferred that the signal to the lamp should be derived from both the front and rear vehicle suspensions so that the signal passed to the lamp is a resultant of the different signals obtained from the front and rear suspensions.

Conveniently the signal may be taken from the rear suspension to the lamp by a cable or linkage additionally displaceable by movement of the front suspension. In the particularly described embodiment the cable passes from the rear suspension to the lamp via a guide mounted on the front suspension whereby the cable is slackened or tightened by up and down movements of the front wheel relative to the vehicle body. The cable may be an encased cable which is bent in an arc to pass through the guide so that curvature of the cable is varied in accordance with the deflection of the front suspension to cause consequent displacement of the inner force-transmitting cable.

In one embodiment there may be provided a summation linkage provided for giving a single output signal for controlling the lamp support in response to two input signals derived respectively from the front and rear vehicle suspensions. Preferably the summation linkage comprises an output lever and a pair of spaced pivotal connections to the output lever, each of the pivotal connections being movable in response to a separate one of the input signals and an output signal connection being secured to the pivotal lever whereby the position of the output connection is responsive to the position of both the pivotal connections. Suitably one of the pivotal connections may be directly movable in response to one input signal and the other is movable via a bellcrank, one arm of which is pivotally connected to the output lever at the other pivotal connection.

When a vehicle is, for example, loaded at the rear as due to heavy loading of the trunk or due to a sharp acceleration, a fixed headlight would tend to be directed upwardly at too high an angle relative to the horizontal with a resultant tendency to dazzle oncoming drivers. With the latter arrangement signals from the vehicle suspension would be transmitted to the summation linkage from which an output signal can be derived as a result of the movements of both the front and rear suspensions, this output signal being used to control the angle of projection in azimuth of the vehicle headlamp. By a proper proportioning of the summation linkage equal deflections of the front and rear suspension, which would not change the attitude of the vehicle on the road and thus the angle or projection of a fixed lamp, are cancelled out so that no output would be derived from the linkage, whereas when one of the front and rear suspensions is deflected more than the other an output signal is produced which produces the appropriate correction in the angle of projection of the vehicle headlamp.

Preferably the cable is held taut by a spring and is connected via the resilient linkage to the pivotal lamp support. Suitably the cable may be connected to a pivoted control lever, a resilient connection being provided between the lever and the lamp support. By appropriately positioning along the lever the points of connection between the lever and the cable and the lever and the lamp support the tilting movements of the lamp support will be in the appropriate ratio relative to the movements of the cable caused by deflections of the vehicle suspension.

Preferably the lamp support is pivoted about a central horizontal axis and is connected via a spring with the lever. The provision of a central horizontal axis is important if the lamp to be carried by the lamp support is to be exposed to the airstream since the pressure of air contacting the front of the lamp would then be balanced above and below the horizontal support. Unwanted deflection of the lamp will not then be caused as a result of variation in vehicle speed causing a consequential variation in the pressure of air contacting the front of the lamp.

In a particularly simple embodiment, as described later, tension springs are connected to the top and bottom of the lamp support to exert forces biasing the lamp in opposite directions about the horizontal pivot, one spring being connected to the lever and the other to a fixed mounting. The fixed mounting and/or the spring connection to the lever are preferably adjustable to permit alteration of the spring tension to facilitate adjustment of the position of the lamp support.

The means for damping pivotal movement of the lamp support may comprise a piston reciprocatable in a cylinder containing liquid in a conventional manner. The provision of the damping means is of importance since the damping means prevents substantial movement of the lamp support as a result of quick deflections of the vehicle wheels, as when going over bumps, but allows proper response to less transient deflections of the suspension, as during acceleration or deceleration of the vehicle, when the vehicle is going up or down slopes, or resulting from changes in static loading of the vehicle as when additional passengers or luggage is loaded thereinto.

The invention will be further described, merely by way of example, with reference to the accompanying drawings, in which:

FIG. 1 is a side elevational diagrammatic view partly in section of a lamp mounting for a lamp system embodying the invention;

FIG. 2 is a diagrammatic plan view partly in section of the lamp housing of FIG. 1;

FIG. 3 is a diagrammatic illustration showing means for deriving a signal from the rear suspension of a vehicle;

FIG. 4 is a diagrammatic view looking forward beneath the fender of a vehicle illustrating how a signal may be derived from the front suspension of a vehicle;

FIG. 5 is a detailed view of an alternative form of part of the construction shown in FIG. 4; and FIG. 6 is a diagrammatic view of a summation linkage which may be used to add signals obtained from the front and rear suspensions.

Referring to the drawings, and in particular FIGS. 1 and 2, there is shown a lamp nacelle 1 adapted to be fixedly secured as a front lamp housing of a vehicle. An annular plate 2 surrounds the front rim of the nacelle 1 and supports, by means of a horizontal axis pivot 3, a lamp support 4. A lamp 6 is carried by the support 4 and is accurately positionable therein by means of conventional screw adjusters 5. The height of the axis of pivot 3 is such as to permit the lamp 6 to pivot about a horizontal axis substantially half way up the height of the lamp.

An arm 7 extends rearwardly of the lamp support 4 and is connected by a pivot 8 to a piston rod 9 carrying a piston 10 for reciprocation in a cylinder 11 of a fluid-filled damper, the cylinder 11 being secured to the rear wall of the nacelle 1. The damper 10, 11 thus acts to damp tilting movements of the lamp support 4 about the horizontal axis of pivot 3.

A tension spring 12 is secured at one end the lamp support 4 by a mounting 13 and is secured at the other end to a mounting 14 fixed to the nacelle 1 via a spring tension adjuster 15. A similar spring arrangement 16, shown in FIG. 2 as being formed of two tension springs in parallel, is secured via supports 17 to the bottom of lamp support 4, the other ends of the springs 16 being secured by a tension adjuster 18 to a control lever 19. The control lever 19, as shown in FIG. 2, is pivoted at one end 22 to the inside of the nacelle and projects at the other end through a slot 23 extending horizontally of the nacelle so as to provide a guide and mounting for the lever permitting it to pivot in a horizontal plane. Extending rearwardly from the lever 19 is the core 20 of an encased cable 21, movements of the core 20 providing a signal for controlling the angle of tilt of the lamp support 4 about the horizontal axis 3. A strong tension spring 24 is secured at one end 25 to the inside surface of the nacelle and at the other end to the lever 19 to maintain the core 20 of the control cable tensioned.

Referring to FIG. 3 the rear end of the core 20 encased in wall 21, is shown secured by an adjuster 27 to a lever arm 26 secured to the torque arm mounting 28 of the rear suspension of the vehicle. With this arrangement upon changing in loading of the vehicle the torque arm 28 will rotate about its mounting with consequential movement of the lever arm 26 causing displacement of the core 20 of the control cable 21.

FIG. 4 is a diagrammatic view showing how the cable 21 passes forwardly through an eye 31 in a guide 32 before reaching the position where the core is connected to the control lever 19. For convenience in this arrangement the cable 21 is shown connected to the lever 19 interiorly of the nacelle 1 although it is preferred to have the cable connected to the lever 19 exteriorly of the nacelle as shown in FIGS. 1 and 2. The guide 32 is secured to the upper suspension arm 29 which is pivotal about a support pivot 30 in response to up and down movements of the vehicle front wheel assembly relative to the vehicle body. Pivotal movements of the arm 29 about pivot 30 will cause consequential movement of the eye 31 of the guide so as to change the curvature of the cable where it passes through the guide. This movement is sufficient to adjust the cable to provide a signal to the lamp responsive to movements of the top suspension arm 29 of the front vehicle suspension.

FIG. 5 shows an alternative arrangement where instead of having a guide bracket 32 a guide bracket 32' is shown secured to a top suspension arm 29'. The cable passes around a pulley 33 carried by the guide bracket 32'.

Although described in relation to an encased cable 21 it will be appreciated that the casing for the control wire is not essential, and also that the signals from the rear and front suspensions can be derived in alternative ways provided that the proper relationship is retained between the front and rear suspension deflections to provide a proper difference signal to the lamp. Thus it should be appreciated that if the front and rear suspensions are deflected to an equal extent there will be no change in attitude of the car relative to the road so that consequently the movements of the cable caused by the two deflections should cancel out so that no signal is passed to the lamp to change its angle of projection.

While FIG. 1 shows the top tension spring 12 as being connected between the fixed mounting and the lamp support 4 and the bottom spring 16 being connected between the lamp support and the control lever 19 the springs may be reversed provided that suitable changes are made so that the deflections of the vehicle suspension cause an appropriate directional signal to be applied to control the angle of projection of the lamp.

As shown in FIG. 2 the points of connection of the cable core 20 and the spring adjuster 18 to the lever 19 are so spaced from the pivot 22 that the rearward end of the tension spring 16 will be moved through about half the movement of the cable core 20. This movement is further reduced by about a half during transmission to the lamp support 4 due to the contraction or expansion of the springs 16 and 12 as a result of the movement applied to them by movement of the control lever 19.

During normal operation of the system, changes in loading of the vehicle will cause a change in attitude of the front suspension arm and/or rear torque arm so that an appropriate signal causes a proportional movement of the lever 19. Movement of the lever 19 is transmitted to the lamp support 4 so as to cause an adjustment of the lamp 6 to ensure that it retains its proper angle of projection in azimuth despite changes in attitude of the vehicle. Changes in attitude of the vehicle occurring during acceleration or deceleration or due to a change in slope of the road over which the vehicle is passing will cause corresponding changes in angle of projection of the lamp due to the lamp support 4 being moved about its horizontal pivot as a result of deflection of the front and rear suspensions. The effect of the damper 10, 11 is to delay immediate response of the lamp mounting 4 so that changes in angle of projection of the lamp as a result of short sharp impulses from the suspension system, as when a wheel passes over a bump in the road, are negligible. Thus when the vehicle is travelling over a rough surface at high speed its wheels may bounce violently and yet, because these movements are very quick, the damper prevents immediate registration of such quick movements on the angle of projection of the lamp, the quick movements being taken up by rapid deflections of the spring 16.

While combined tension springs 12 and 16 have been shown in the illustrated embodiment it will be appreciated that other spring means may be utilized for providing the resilient connection between the input for the transmission signal and the lamp itself so as to enable the damper to function properly to prevent too rapid a response of the lamp to transient suspension movements.

The control operated by the front suspension, as indicated above, works in reverse to the control provided at the rear of the car. If the rear end of a car goes down the rear wheel signal must cause dipping of the lights but if the front end goes down it must raise the lights, and vice versa, if proper angle of projection of the lamps is to be obtained. Thus in the case of a heavy load being applied to the trunk of a car the rear signal will dip the lights in proportion to the trunk load, but because the front lifts as well to a slight extent this will cause a small additional signal to be added to cause additional dipping. Similarly for example, a car going up a steep hill will not only go down at the rear but will lift at the front, and the two signals will compensate for this.

While, in general, any convenient means may be used to obtain a control signal for the lamps in response to initial signals obtained from both the front and rear suspensions of the vehicle, a particularly convenient form of summation linkage is illustrated in FIG. 6 for converting the input signals from the front and rear vehicle suspensions into a single output signal which may be used to control the angle of projection of the vehicle lamp.

Referring to FIG. 6 there is illustrated a flat box 51 into which is led a first input cable 52 encased by a casing 53. The second input to the box 51 comprises a cable 54 secured for movement with the lower suspension arm 66 of the front suspension of a vehicle. The cable 52 is connected for movement in response to the movement of the rear vehicle suspension.

The cable 52 is connected by an adjustable screw connector 56 to a pivot support 57 provided at 58 with a pivotal connection to an output lever 59. The other end of the output lever 59 is provided with a pivotal connection 61 to one arm of a bellcrank lever 62 which is pivoted at 63 to the box 51. The other arm of the bellcrank lever 62 is connected at 64 to the input cable 54. An output cable 55 is connected via an output connection 60 to the output lever 59. As shown a tension spring 65 is provided to assist in maintaining the cable 54 taut.

When the summation linkage is mounted in a vehicle having a self-levelling headlight system of the kind illustrated and described above, the cable 55 is connected to a self-levelling vehicle lamp mounting and is maintained in tension. Accordingly the tension in the cable 55 helps to maintain cable 54 tensioned and also applies a tension via the lever 59 to the cable 52 leading to the rear vehicle suspension. With the arrangement shown an upward deflection of the rear wheels of the vehicle due, for example, to heavy loading of the trunk of the vehicle, causes cable 52 to be pulled rearwardly with consequent rearward movement of the pivotal connection 58 and a smaller rearward movement of the output connection 60 with consequent movement of the output cable 55 to cause tilting of the headlamp of the vehicle to counteract the downward tilting of the rear of the vehicle. Similarly a reduction in deflection of the front vehicle suspension will cause downward movement of the cable 54 with a consequent rearward movement of the cable 55 to cause a downward dipping of the vehicle headlamps. Opposite movement of the output cable 55 with upward tilting of the vehicle headlamp will be caused if the loading at the rear of the vehicle is reduced or the loading at the front of the vehicle is increased. Preferably the position of the output connection 60 along the output lever 59 is adjustable so that the proportional effect of the front and rear suspensions may be adjusted. Thus if the output connection 60 is moved nearer to the pivotal connection 58 from the position shown on the drawing this would have the effect of increasing the output movement of the cable 55 and thus displacement of the lamp in response to a given deflection of the rear suspension, and would similarly have the effect of reducing the movement of the output cable 55 in response to deflection of the first suspension.

I claim:

1. In an automotive vehicle having a resiliently displaceable suspension, a self-levelling lamp system comprising a lamp support, means mounting said lamp support for pivotal movement, a resilient force transmission linkage connected to said lamp support, signal-providing means carried by said vehicle suspension to provide a mechanical signal having an amplitude responsive to displacements of the vehicle relative to a road surface and a mechanical signal-transmitting means connected between said signal-providing means and said linkage, said resilient linkage applying a correcting bias to tilt the lamp support responsive to changes in said mechanical signal upon changes in vehicle attitude as measured by aid signal-providing means, wherein the signal-transmitting means includes a summation linkage having a single output signal member connected to said linkage and first and second input members connected to the signal-providing means at the front and rear vehicle suspension respectively, said summation linkage comprising a fixed housing, an output lever having said output signal member secured thereto, and a bellcrank pivoted to said housing and having one arm pivotally supporting one end of the output lever, the other end of said output lever being pivoted to the second input signal member, said second input signal member being carried by said housing for movement substantially at right angles to said output member and said first input signal member being secured to the other arm of said bellcrank whereby the position of the output signal member is responsive to the position of both the input signal members.

2. In an automotive vehicle having a resiliently displaceable suspension, a self-levelling lamp system comprising a lamp support, means mounting said lamp support for pivotal movement, a resilient force transmission linkage connected to said lamp support, signal-providing means carried by said vehicle suspension to provide a mechanical signal having an amplitude responsive to displacements of the vehicle relative to a road surface and a mechanical signal-transmitting means connected between said signal-providing means and said linkage, said resilient linkage applying a correcting bias to tilt the lamp support responsive to changes in said mechanical signal upon changes in vehicle attitude as measured by said signal-providing means, and further comprising a fixed mounting secured to said vehicle and wherein the resilient linkage comprises a pair of interconnected spring means arranged in series with one spring means being connected to an tensioned between said fixed mounting and the interconnection with the other spring means, said other spring means being connected and tensioned between said interconnection and the signal-transmitting means, said lamp support being controlled in accordance with movements of said interconnection.

3. In an automotive vehicle having a resiliently displaceable suspension, a self-levelling lamp system comprising a lamp support, means mounting said lamp support for pivotal movement, a resilient force transmission linkage connected to said lamp support, signal-providing means carried by said vehicle suspension to provide a mechanical signal having an amplitude responsive to displacements of the vehicle relative to a road surface and a mechanical signal-transmitting means connected between said signal-providing means and said linkage, said resilient linkage applying a correcting bias to tilt the lamp support responsive to changes in said mechanical signal upon changes in vehicle attitude as measured by said signal-providing means, wherein the signal-transmitting means comprises a pivoted control output lever pivotally movable in response to the transmitting signal, said lamp system including a fixed spring mounting and the resilient linkage comprising tension springs connected to the top and bottom of the lamp support to exert forces biasing the lamp support in opposite directions, one spring being connected to the control lever and the other to said fixed spring mounting.

4. A lamp system according to claim 1, wherein the position of securement of the output signal member to the output lever is adjustable lengthwise of the output lever.

5. A lamp system according to claim 2, wherein the lamp support itself provides said interconnection, both said spring means being directly connected to said lamp support.

6. A lamp system according to claim 3, including adjustable means connecting the springs respectively to said control lever and said fixed spring mounting whereby the spring tensions are adjustable.

7. In a vehicle having road wheels, a body and a resiliently displaceable suspension supporting the body on the road wheels, a self-levelling lamp system comprising a lamp, means mounting said lamp for pivotal movement about a substantially horizontal axis extending transversely of the lamp at midheight thereof, means for damping pivotal movement of the lamp about said axis, signal-providing means carried by said vehicle suspension to provide a mechanical signal having an amplitude responsive to the displacement of the vehicle body relative to the road wheels, a mechanical signal-transmitting means connected between said signal-providing means and a signal output member, and a resilient linkage connected to said output member for applying a correcting bias to tilt the lamp support about said axis responsive to changes in said mechanical signal upon changes in vehicle attitude as measured by said signal-providing means, said resilient linkage comprising a fixed support, a movable member, a first spring tensioned between said fixed support and said movable member, and a second spring tensioned between said movable member and said output member, said movable member being connected with said lamp whereby said lamp is movable about said axis in accordance with movements of said movable member.

8. A lamp system according to claim 7, wherein said lamp is carried by said movable member, said movable member itself being pivotally mounted for tilting movement about said horizontal axis.

* * * * *